(12) United States Patent
Choi

(10) Patent No.: US 7,746,610 B2
(45) Date of Patent: Jun. 29, 2010

(54) DEVICE FOR DISCHARGING STATIC ELECTRICITY

(75) Inventor: Nak Heon Choi, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

(21) Appl. No.: 11/771,323

(22) Filed: Jun. 29, 2007

(65) Prior Publication Data

US 2008/0123229 A1      May 29, 2008

(30) Foreign Application Priority Data

Jun. 30, 2006    (KR) ...................... 10-2006-0061588

(51) Int. Cl.
  *H02H 9/00* (2006.01)
(52) U.S. Cl. ........................................ 361/56
(58) Field of Classification Search ............. 361/56
  See application file for complete search history.

(56) References Cited

U.S. PATENT DOCUMENTS 6,768,616 B2 *   7/2004   Mergens et al. ............... 361/56

2002/0089017 A1 *   7/2002   Lai et al. .................... 257/355
2005/0195540 A1 *   9/2005   Streibl et al. ................. 361/56

FOREIGN PATENT DOCUMENTS

| KR | 1020020002701 A | 1/2002 |
| KR | 1020040012608 A | 2/2004 |
| KR | 1020060020849 A | 3/2006 |
| KR | 1020060038604 | 5/2006 |

* cited by examiner

*Primary Examiner*—Robert DeBeradinis
*Assistant Examiner*—Scott Bauer
(74) *Attorney, Agent, or Firm*—Ladas & Parry LLP

(57) ABSTRACT

A device for discharaging static electricity protects an internal circuit against an electrostatic current. The device includes a discharge part which is connected between an input/output pad and a ground voltage line to form a discharge path discharging an electrostatic current introduced from an input/output pad; and an amplification circuit which is connected in parallel with the discharge part and supplies a sense amplification signal generated by amplifying the electrostatic current as a control signal of the discharge part.

7 Claims, 2 Drawing Sheets

DEVICE FOR DISCHARGING STATIC ELECTRICITY

CROSS-REFERENCE TO RELATED APPLICATIONS

The present application claims priority to Korean patent application number 10-2006-061588 filed on Jun. 29, 2006, which is incorporated herein by reference in its entirety.

BACKGROUND OF THE INVENTION

The present invention relates to a semiconductor device, and more particularly, to a device for discharging static electricity, which can protect an internal circuit against an electrostatic current.

Generally, electrostatic discharge (ESD) is a rapid flow of electric current that takes place when two mutually insulated objects with significantly different potentials come into direct contact with each other.

When an ESD is introduced to a semiconductor device, circuits inside the device can be damaged. In order to protect internal circuits, most semiconductor devices include one or more ESD protection units between an externally located electrical contact pad for the device and internal circuits.

A diode, a metal oxide silicon (MOS) transistor and a silicon controlled rectifier (SCR) are all used as ESD protection units.

An SCR is an ESD protection unit, which can receive a high ESD current per unit area of its semiconductor junctions and which has low junction capacitance and low operating resistance. However, an SCR disadvantageously has a higher operation voltage than other ESD protection units.

FIG. 1 illustrates a conventional prior art circuit 10 for discharging static electricity.

Referring to FIG. 1, in order to discharge an electrostatic current introduced to an input/output pad 102 to a ground voltage line (or VSS: 104), the conventional circuit 10 for discharging static electricity uses a silicon controlled rectifier (SCR) having a relatively high operation voltage as a discharge part between the input/output pad 102 and the VSS 104. In order to reduce the operating voltage of the SCR 110, the circuit 10 also includes an NMOS transistor 120 as a drive element, connected between the input/output pat 102 and the SCR 110, and which detects a drive current 12 and then supplies it to the SCR 110. Therefore, the device 10 operating voltage can be reduced to a breakdown voltage of the NMOS transistor 120, while ESD effect of the SCR 110 is maintained.

In the device shown in FIG. 1, the SCR 110 is not operated until the electrostatic voltage reaches the brakedown voltage. Thus, a circuit internal to a semiconductor device might not be adequately protected from static electricity at an initial or relatively low voltage range of an electrostatic pulse.

SUMMARY OF THE INVENTION

The present invention provides a device for discharging static electricity, which reduces the operation voltage and rapidly operates at an initial range of an electrostatic pulse, thereby protecting an internal circuit more effectively.

The present invention also provides a device for discharging static electricity, which amplifies an introduced electrostatic current and then provides it as a control signal of the SCR, thereby safely protecting the internal circuit at the initial range of static electricity.

According to an aspect of the present invention, there is provided device for discharging static electricity, comprising a discharge part which is connected between an input/output pad and a ground voltage line to form a discharge path discharging an electrostatic current introduced from an input/output pad; and an amplification circuit which is connected in parallel with the discharge part and supplies a sense amplification signal generated by amplifying the electrostatic current as a control signal of the discharge part.

In the aforementioned aspect of the present invention, the discharge part is a SCR element.

In addition, the discharge part comprises a first resistor and a NPN bipolar transistor which are connected in series between the input/output pad and the ground voltage line; and in parallel thereto, a PNP bipolar transistor and a second resistor which are connected in series between the input/output pad and the ground voltage line, wherein a first node which is commonly connected with the first resistor and the NPN bipolar transistor is connected with a base of the PNP bipolar transistor, and a second node which is commonly connected with the PNP bipolar transistor and the second resistor is connected with a base of the NPN bipolar transistor, thereby forming a latch, and the discharge part is operated when the sense amplification signal amplified in the amplification circuit is supplied to the second node.

In addition, the amplification circuit comprises a drive control part which comprises a first NMOS transistor of which a drain is connected with the input/output pad and a gate is connected with the second node, and a resistor of which one end is connected with the ground voltage line and the other is connected with a source of the first NMOS transistor, and which detects a detection voltage generated at a third node commonly connected with the first NMOS transistor and the resistor; and a drive part which comprises a second NMOS transistor of which a drain is connected with the input/output pad and a source is connected with the second node and a gate is connected with the third node, and which is operated by the detection voltage to generate the sense amplification signal amplified corresponding to an electrostatic current and provide it to the second node.

In addition, the amplification circuit is constructed such that the gate of the first NMOS transistor is connected with the source of the second NMOS transistor, and the gate of the second NMOS transistor is connected with the source of the first NMOS transistor, and the first and second NMOS transistors mutually form a latch to amplify the signal.

In addition, the amplification circuit comprises a drive control part which comprises a NMOS transistor of which a source is connected with the ground voltage line and a gate is connected with the second node, and a resistor of which one end is connected with the input/output pad and the other is connected with a drain of the NMOS transistor, and which detects a voltage drop generated at a fourth node commonly connected with the NMOS transistor and the resistor by the electrostatic current; and a drive part which comprises a PMOS transistor of which a drain is connected with the input/output pad and a source is connected with the second node and a gate is connected with the fourth node, and which is operated by the voltage drop to generate the sense amplification signal amplified corresponding to an electrostatic current and provide it to the second node.

In addition, the amplification circuit is constructed such that the the gate of the NMOS transistor is connected with the source of the PMOS transistor, and the gate of the PMOS transistor is connected with the drain of the NMOS transistor, and the NMOS transistor and the PMOS transistor mutually form a latch to amplify the signal.

In addition, the device is connected between an external power voltage line and the ground voltage line.

DESCRIPTION OF SPECIFIC EMBODIMENTS

Hereinafter, exemplary embodiments of the present invention will be described with reference to the accompanying drawings.

Figure 1:
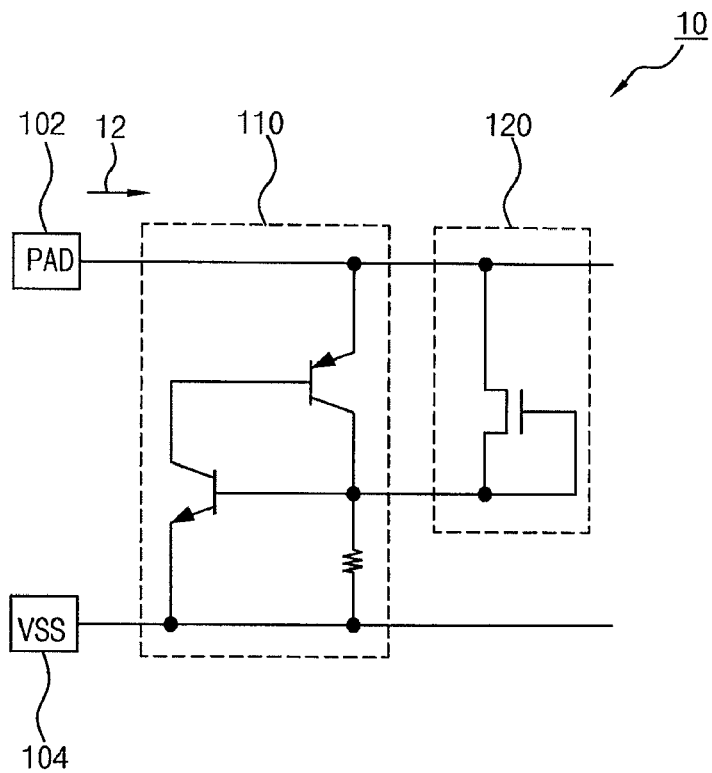
FIG. 1 is a circuit diagram of a prior art conventional device for discharging static electricity.
Figure 2:
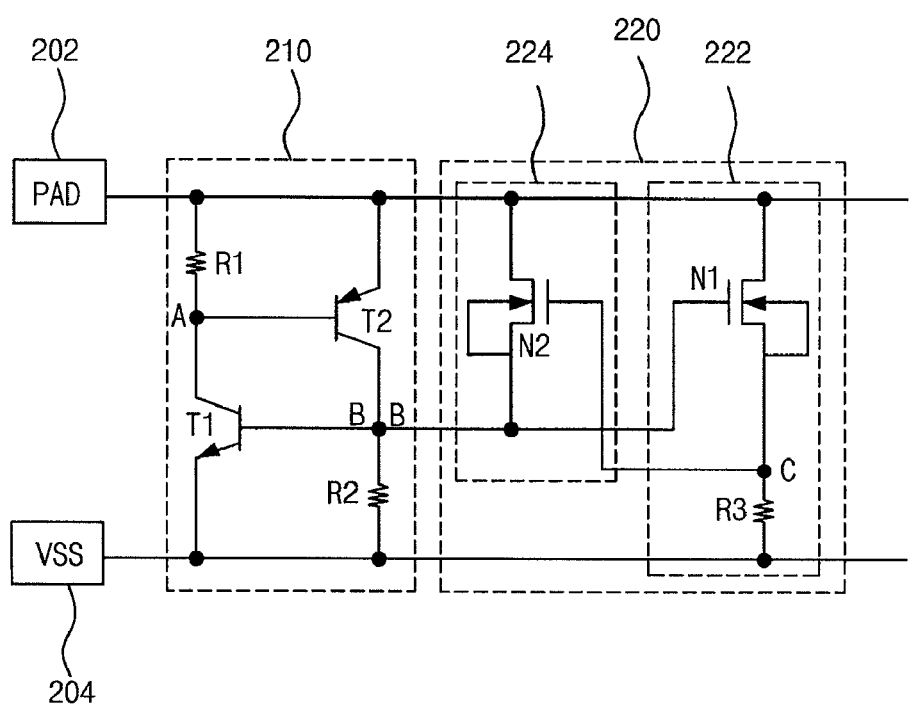
FIG. 2 is a circuit diagram of a device for discharging static electricity according to an embodiment of the present invention.

FIG. 2 is a circuit diagram of a device for discharging static electricity according to an embodiment of the present invention. A discharge part 210 and an amplification circuit 220 are connected in parallel to each other, and connected between an input/output pad 202 and a ground voltage line (or VSS) 204. The discharge part 210 is controlled by a sense amplification signal of the amplification circuit 220.

In order to discharge an electrostatic current to the VSS 204, the discharge part 210, which is embodied as a SCR, is constructed such that a resistor R1 and an NPN bipolar transistor T1 are connected in series with each other between the input/output pad 202 and the VSS 204, and in parallel with a PNP bipolar transistor T2 connected in series with a resistor R2 and which are themselves also connected between the input/output pad 202 and the VSS 204.

A common connection node A of the resistor R1 and the collector of NPN bipolar transistor T1, is connected to the base of PNP bipolar transistor T2. A common connection node B of the collector of PNP bipolar transistor T2 and the resistor R2, is connected to the base of the NPN bipolar transistor T1. Connected as they are in FIG. 2, transistors T1 and T2 and the resistors R1 and R2 form a latch.

The sense amplification signal of the amplification circuit 220, is provided to the node B of the discharge part, and the amplification circuit 220 is provided with a drive control part 222 and a drive part 224.

The drive control part 222 includes a NMOS transistor N1, the drain of is connected to the input/output pad 202 and a drain and a gate is connected with the node B, and a resistor R3 of one end is connected to a source of the NMOS transistor N1 and the other end is connected to the VSS 204, and applies a detection voltage detected at a common connection node C of the NMOS transistor N1 and the resistor R3 to the drive part 224.

The drive part 224 includes a NMOS transistor N2, the drain of which is connected with the input/output pad 202 and a source is connected to the node B and a gate is connected to the node C. The drive part 224 is turned on by the detection voltage of the drive control part 222 and applies the sense amplification signal generated by amplifying the electrostatic current from the input/output pad 202 to the node B, thereby reducing the operation voltage of the discharge part 210 and thus causing a fast discharge operation.

Hereinafter, the operation of the device for discharging static electricity according to the embodiment of the present invention will be described, referring to FIG. 2. If an electrostatic pulse is introduced to the input/output pad 202, a voltage of the node C is raised by a current through the NMOS transistor N1 and the resistor R3 of the drive control part 222, and the gate voltage of NMOS transistor N2 of the drive part 222 is regulated by the increased voltage. Current applied to the discharge part 210 can thus be regulated.

That is, the larger the amount of current passing thorugh the NMOS transistor N1 of the drive control part 222 is, the more the voltage of node C is increased. Thus, a drive current flowed to the node B through the NMOS transistor N2 is increased. Further, the amount of current passing through the NMOS transistor N1 of the drive control part 222 is regulated by the voltage provided at the NMOS transistor N2 of the drive part 224. In other words, if the drive current supplied through the NMOS transistor N2 of the drive part 224 is large, the gate voltage of the NMOS transistor N1 of the drive control part 222 is increased. Therefore, the current passing through the NMOS transistor N1 is increased.

As described above, the current at the drive control part 222 and the drive part 224 have the relationship of a positive feedback. Therefore, when a high pulse at the initial state of static electricity is applied through the input/output pad 202, the amplification circuit 220 amplifies a very small amount of current generated from the NMOS transistor N1 of the drive control part 222 and the NMOS transistor N2 of the drive part 224 to generate the sense amplification signal and then provides it to the discharge part 210, thereby rapidly operating the discharge part 210 and thus protecting an internal circuit against the static electricity.

Figure 3:
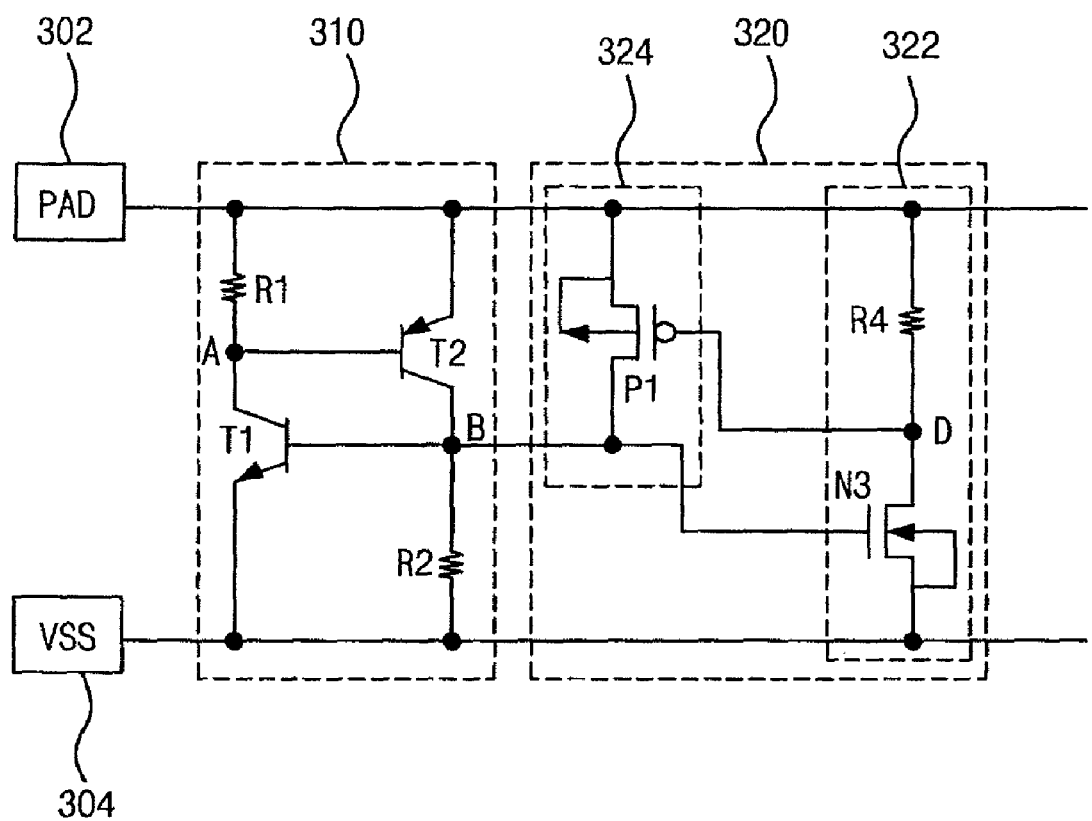
FIG. 3 is a circuit diagram of a device for discharging static electricity according to anthor embodiment of the present invention.

FIG. 3 is a circuit diagram of a device for discharging static electricity according to anthor embodiment of the present invention.

Referring to FIG. 3, in the device for discharging static electricity according to anthor embodiment of the present invention like the device of FIG. 2, a discharge part 310 and an amplification circuit 320 are connected in parallel with each other and between an input/output pad 302 and a ground voltage line (or VSS) 404, and the discharge part 310 is controlled by a sense amplification signal of the amplification circuit 320.

The discharge part 310 has the same structure as the discharge part 210 of FIG. 2. In order to discharge an electrostatic current to VSS 304, a resistor R1 and an NPN bipolar transistor T1 are connected in series between the input/output pad 302 and the VSS 304, and in parallel thereto, a PNP bipolar transistor T2 and a resistor R2 are connected in series between the input/output pad 302 and the VSS 304.

A common connection node A of the resistor R1 and the NPN bipolar transistor T1 is connected to a base of the PNP bipolar transistor T2, and a common connection node B of the PNP bipolar transistor T2 and the resistor R2 is connected to the base of the NPN bipolar transistor T1, thereby forming a latch.

The sense amplification signal of the amplification circuit 320 is provided to the node B of the discharge part 310, and the amplification circuit 320 is provided with a drive control part 322 and a drive part 324.

The drive control part 322 includes a NMOS transistor N3 of which a source is connected with the VSS 304 and a drain and a gate is connected with the node B, and a resistor R4 of one end is connected to the input/output pad 302 and the other end is connected to the a drain of the NMOS transistor N3, and detects a voltage drop generated at the a common connection node D of the resistor R4 and the NMOS transistor N3 by the electrostatic current and applies it to the drive part 324.

The drive part 324 includes a PMOS transistor P1 of which a drain is connected with the input/output pad 302 and a source is connected to the node B and a gate is connected to the node D. The drive part 224 is turned on by the detection voltage of the drive control part 322, which is applied to the gate, and applies the sense amplification signal generated by amplifying the electrostatic current from the input/output pad 302 to the node B, thereby reducing the operation voltage of the discharge part 310 and thus causing a fast discharge operation.

Hereinafter, the operation of the device for discharging static electricity according to another embodiment of the present invention will be described, referring to FIG. 3. If an electrostatic pulse is introduced to the input/output pad 302, a voltage drop occurs at node D by the current through the resistor R4 and the NMOS transistor N3 of the drive control part 322. The gate voltage of the PMOS transistor P1 of the drive part 324 is regulated by the dropped voltage and thus an amount of current applied to the discharge part 310 can be regulated.

That is, the larger the amount of current passing through the NMOS transistor N3 of the drive control part 322 is, the more the drive current flowed through the PMOS transistor P1 of the drive part 324 to the node B is increased. Thus, a drive current flowed to the node B through the PMOS transistor P1 of the drive part 324 is increased.

Further, the amount of current passing through the NMOS transistor N3 of the drive control part 322 is regulated by the voltage provided at the PMOS transistor P1 of the drive part 324.

In other words, if the drive current supplied through the PMOS transistor P1 of the drive part 324 is large, the gate voltage of the NMOS transistor N3 of the drive control part 322 is increased. Therefore, the current passing through the NMOS transistor N3 is increased.

As described above, the current at the drive control part 322 and the drive part 324 have the relationship of a positive feedback. Therefore, when a high pulse at the initial state of static electricity is applied, the amplification circuit 320 amplifies a very small amount of current generated from the NMOS transistor N3 of the drive control part 322 and the PMOS transistor P1 of the drive part 324 and generates the sense amplification signal.

The the amplification circuit 320 amplifies the electrostatic current introduced through the input/output pad 302 to generate the sense amplification signal and then provides the sense amplification signal to the SCR 310, thereby rapidly operating the discharge part 210 and thus protecting an internal circuit against the static electricity.

Therefore, the present invention provides a device for discharging static electricity, which reduces the operation voltage and rapidly operates at an initial range of an electrostatic pulse, thereby safely protecting an internal circuit.

Further, the present invention also provides a device for discharging static electricity, which amplifies an introduced electrostatic current and then provides it as a control signal of the SCR, thereby safely protecting the internal circuit at the initial range of static electricity.

What is claimed is:

1. A device for discharging static electricity, comprising:
a discharge part which is coupled between an input/output pad and a ground voltage line to form a discharge path, discharging an electrostatic current introduced to the input/output pad; and
an amplification circuit, which is coupled in parallel with the discharge part and which supplies a sense amplification signal that is generated by amplifying the electrostatic current as a control signal of the discharge part, wherein the amplification circuit comprises:
a drive control circuit, which comprises a first NMOS transistor, the drain of which is coupled to the input/output pad and a gate is coupled to a first node, and a first resistor of which one end is coupled to the ground voltage line and the other is coupled to a source of the first NMOS transistor, and which detects a detection voltage generated at a second node commonly connected with the first NMOS transistor and the first resistor; and
a drive part which comprises a second NMOS transistor, the drain of which is coupled to the input/output pad and a source is coupled to the first node and a gate is coupled to the second node, and which is operated by the detection voltage to generate the sense amplification signal amplified corresponding to an electrostatic current and provide it to the first node.

2. The device according to claim 1, wherein the discharge part is a silicon controlled rectifier (SCR).

3. The device according to claim 2, wherein the discharge part comprises a second resistor and a NPN bipolar transistor which are coupled in series between the input/output pad and the ground voltage line; and in parallel thereto, a PNP bipolar transistor and a third resistor which are coupled in series between the input/output pad and the ground voltage line,
wherein a third node which is commonly coupled with the second resistor and collector of the NPN bipolar transistor is coupled with a base of the PNP bipolar transistor, and the first node which is commonly connected with the collector of the PNP bipolar transistor and the third resistor is connected with a base of the NPN bipolar transistor, thereby forming a latch, and the discharge part is operated when the sense amplification signal amplified in the amplification circuit is supplied to the first node.

4. The device according to claim 1, wherein the amplification circuit is constructed such that the gate of the first NMOS transistor is coupled to the source of the second NMOS transistor, and the gate of the second NMOS transistor is coupled to the source of the first NMOS transistor, and the first and second NMOS transistors mutually form a latch to amplify the signal.

5. The device according to claim 1, wherein the device is connected between an external power voltage line and the ground voltage line.

6. A device for discharging static electricity, comprising:
a discharge part which is coupled between an input/output pad and a ground voltage line to form a discharge path, discharging an electrostatic current introduced to the input/output pad; and
an amplification circuit, which is coupled in parallel with the discharge part and which supplies a sense amplification signal that is generated by amplifying the electrostatic current as a control signal of the discharge part, the amplification circuit comprising:
a drive control part which comprises a NMOS transistor of which a source is coupled to the ground voltage line and a gate is coupled to a first node, and a resistor of which one end is coupled to the input/output pad and the other is coupled to a drain of the NMOS transistor, and which detects a voltage drop generated at a second node commonly coupled to the NMOS transistor and the resistor by the electrostatic current; and
a drive part which comprises a PMOS transistor of which a drain is coupled to the input/output pad and a source is coupled to the first node and a gate is coupled to the second node, and which is operated by the voltage drop to generate the sense amplification signal amplified corresponding to an electrostatic current and provide it to the first node.

7. The device according to claim 6, wherein the amplification circuit is constructed such that the gate of the NMOS transistor is coupled to the source of the PMOS transistor, and the gate of the PMOS transistor is coupled to the drain of the NMOS transistor, and the NMOS transistor and the PMOS transistor mutually form a latch to amplify the signal.

* * * * *